(12) United States Patent
Candelaria

(10) Patent No.: US 11,319,991 B2
(45) Date of Patent: May 3, 2022

(54) BEARINGLESS HUB ASSEMBLY WITH ELECTROMAGNETIC DRIVE SYSTEM AND ASSOCIATED METHODS

(71) Applicant: Bernabe Segura Candelaria, Roy, UT (US)

(72) Inventor: Bernabe Segura Candelaria, Roy, UT (US)

( * ) Notice: Subject to any disclaimer, the term of this patent is extended or adjusted under 35 U.S.C. 154(b) by 0 days.

(21) Appl. No.: 17/177,561

(22) Filed: Feb. 17, 2021

(65) Prior Publication Data

US 2021/0301869 A1     Sep. 30, 2021

Related U.S. Application Data

(63) Continuation of application No. 16/486,483, filed on Nov. 9, 2018, now Pat. No. 10,955,000.

(51) Int. Cl.
*F16C 32/04* (2006.01)
*B60B 27/00* (2006.01)
*H02K 7/09* (2006.01)

(52) U.S. Cl.
CPC ...... *F16C 32/0451* (2013.01); *B60B 27/0015* (2013.01); *F16C 32/047* (2013.01); *F16C 32/0476* (2013.01); *H02K 7/09* (2013.01); *B60B 2380/22* (2013.01)

(58) Field of Classification Search
CPC ............... F16C 32/0451; F16C 32/047; F16C 32/0476; H02K 7/09
See application file for complete search history.

(56) References Cited

U.S. PATENT DOCUMENTS

| | | | | |
|---|---|---|---|---|
| 3,860,300 A | * | 1/1975 | Lyman ................ | F16C 32/0444 310/90.5 |
| 5,216,308 A | * | 6/1993 | Meeks ................ | F16C 32/0459 310/90.5 |
| 5,386,166 A | * | 1/1995 | Reimer ............... | F16C 32/0476 310/90.5 |
| 5,749,700 A | * | 5/1998 | Henry ................ | F16C 32/0459 415/104 |
| 5,783,887 A | * | 7/1998 | Ueyama .................. | B23Q 1/70 310/90.5 |
| 5,924,186 A | * | 7/1999 | Nakagawa ............... | H02K 7/09 29/602.1 |

(Continued)

*Primary Examiner* — Robert W Horn
(74) *Attorney, Agent, or Firm* — William A. Harding; George Philip Zies

(57) ABSTRACT

A bearingless hub assembly comprising a rim hollowed to receive a tube magnet, and magnets embedded around the circumference of the rim on both ends. The rim is capped by front and rear rim plates configured to hold the embedded magnets in place and fitted to receive respective circular magnets. Similar magnets in corresponding front or rear drive plate maintain space (i.e., levitation) vis-à-vis the front and rear rim caps by repelling each other, thus allowing the rim (and, as applied, a mechanically-attached tire assembly) to move freely with no friction. The front and rear drive plate carry forward and reverse electromagnetic actuators as well as forward and reverse levitation control units, power generators and speed sensors. These components mount 360 degrees around the circumference of the drive plates while the embedded magnets of the rim spin through when in motion.

20 Claims, 14 Drawing Sheets

(56) References Cited

U.S. PATENT DOCUMENTS

| | | | | |
|---|---|---|---|---|
| 5,977,677 | A * | 11/1999 | Henry | F16C 39/02 310/90.5 |
| 6,350,109 | B1 * | 2/2002 | Brunet | F04D 29/0465 417/365 |
| 6,611,073 | B2 * | 8/2003 | Kanebako | F16C 32/0468 310/179 |
| 6,617,734 | B2 * | 9/2003 | Taniguchi | F04D 19/048 310/90.5 |
| 6,736,614 | B1 * | 5/2004 | Bahnen | F04B 35/045 417/417 |
| 6,873,235 | B2 * | 3/2005 | Fiske | F16C 32/0438 335/306 |
| 7,276,828 | B2 * | 10/2007 | Yeh | F04D 29/058 310/67 R |
| 7,635,937 | B2 * | 12/2009 | Brunet | F16C 32/0459 310/90.5 |
| 7,847,456 | B2 * | 12/2010 | Kori | H02K 1/325 310/156.01 |
| 7,884,521 | B2 * | 2/2011 | Buhler | H02K 7/09 310/216.121 |
| 9,059,610 | B2 * | 6/2015 | Fan | F16C 32/0478 |
| 9,657,774 | B2 * | 5/2017 | Kozaki | F16C 32/0451 |
| 10,119,592 | B2 * | 11/2018 | Deane | F16C 32/0408 |
| 10,305,348 | B2 * | 5/2019 | Wong | H02K 7/025 |
| 10,326,332 | B2 * | 6/2019 | De Lepine | H02K 7/09 |
| 10,424,993 | B2 * | 9/2019 | Wong | H02K 1/2793 |
| 10,473,157 | B2 * | 11/2019 | Brakensiek | D01H 4/14 |
| 10,612,592 | B2 * | 4/2020 | El-Shafei | F16C 17/022 |
| 10,955,000 | B2 * | 3/2021 | Candelaria | F16C 32/047 |
| 11,108,298 | B2 * | 8/2021 | Makino | H02K 7/14 |
| 11,162,503 | B2 * | 11/2021 | Sakawaki | F16C 32/0446 |
| 2010/0033046 | A1 * | 2/2010 | Chiba | H02K 1/2746 310/90.5 |
| 2010/0231076 | A1 * | 9/2010 | Chiba | H02K 7/09 310/90.5 |
| 2011/0168466 | A1 * | 7/2011 | Starr | B60L 7/26 180/65.51 |
| 2012/0267974 | A1 * | 10/2012 | Lebenbom | H02K 7/00 310/113 |
| 2014/0023534 | A1 * | 1/2014 | Ramdane | F16C 32/0495 417/420 |
| 2014/0125176 | A1 * | 5/2014 | Swann | F16C 32/0614 310/90.5 |
| 2014/0199179 | A1 * | 7/2014 | Da Silva | F04D 29/058 417/44.1 |
| 2017/0234364 | A1 * | 8/2017 | Sakawaki | F16C 32/0451 310/90.5 |
| 2019/0120290 | A1 * | 4/2019 | Jung | H02K 7/09 |
| 2019/0280578 | A1 * | 9/2019 | Hsing | H02K 7/085 |
| 2019/0301527 | B2 * | 10/2019 | Osama | F16C 32/0461 |
| 2020/0232506 | A1 * | 7/2020 | Vikman | H02K 9/18 |
| 2020/0350812 | A1 * | 11/2020 | Vogt | F16C 32/047 |
| 2021/0301869 | A1 * | 9/2021 | Candelaria | F16C 32/047 |
| 2021/0354678 | A1 * | 11/2021 | Weimar | F16D 65/28 |

* cited by examiner

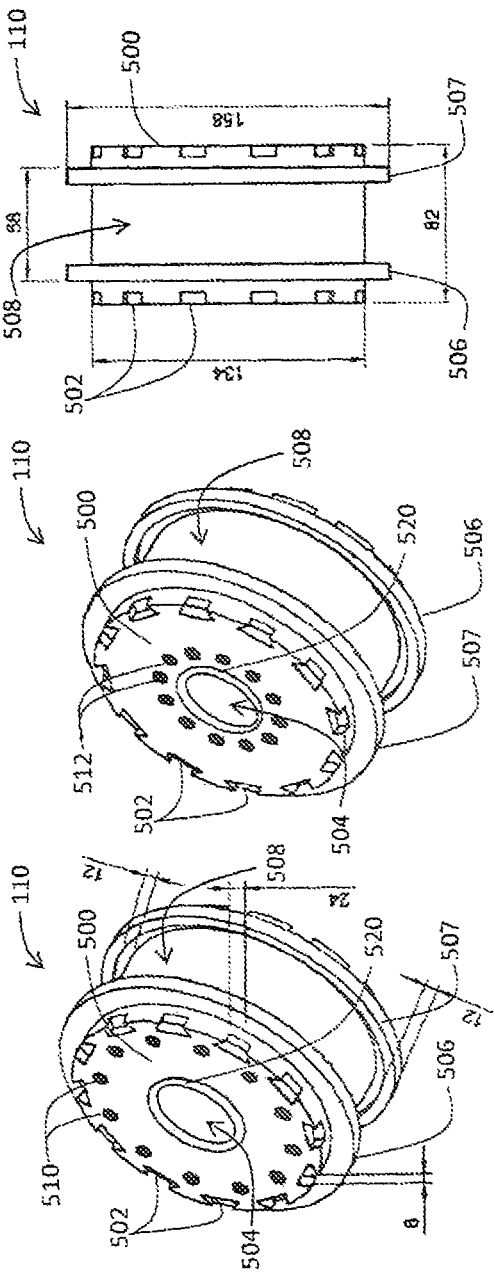
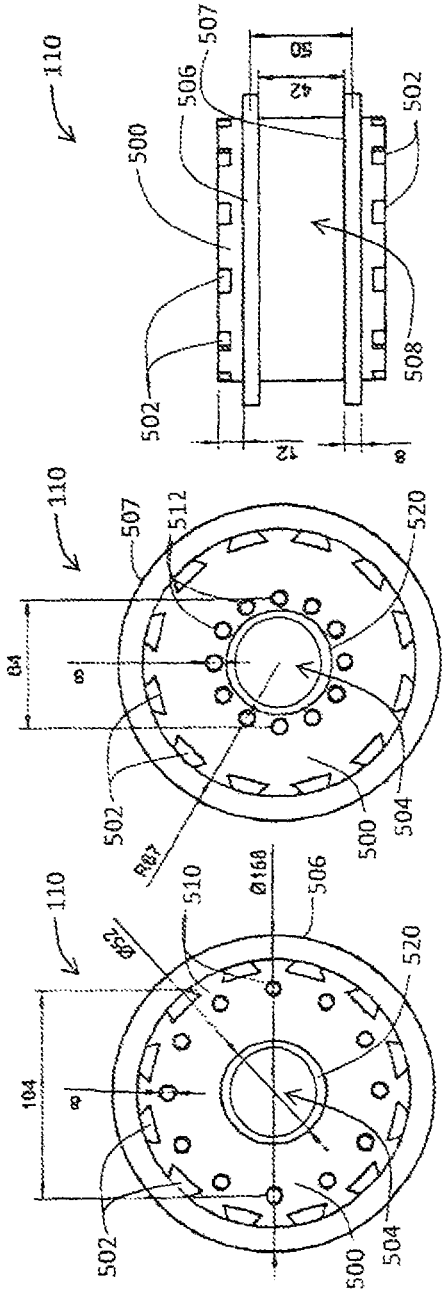

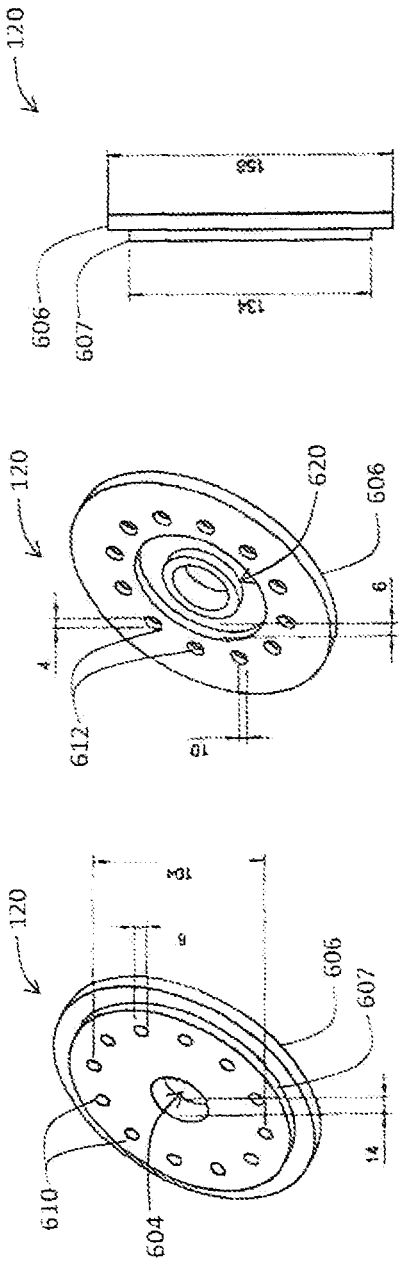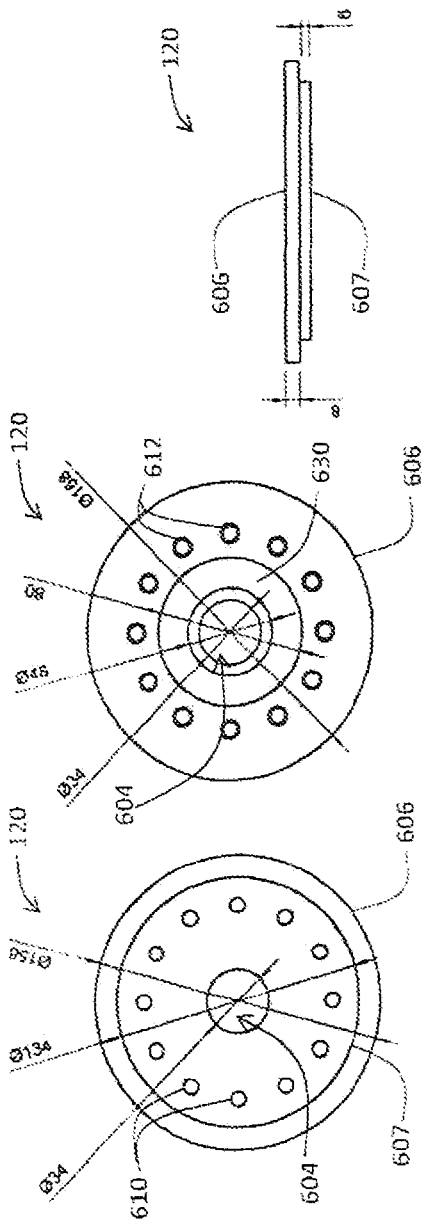

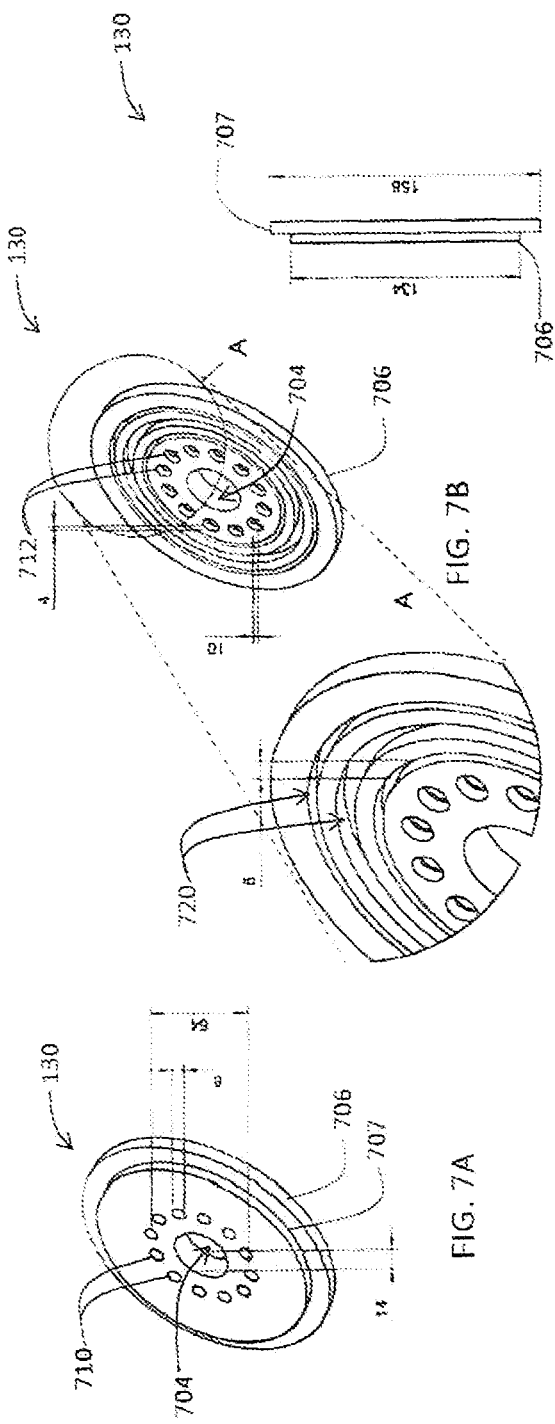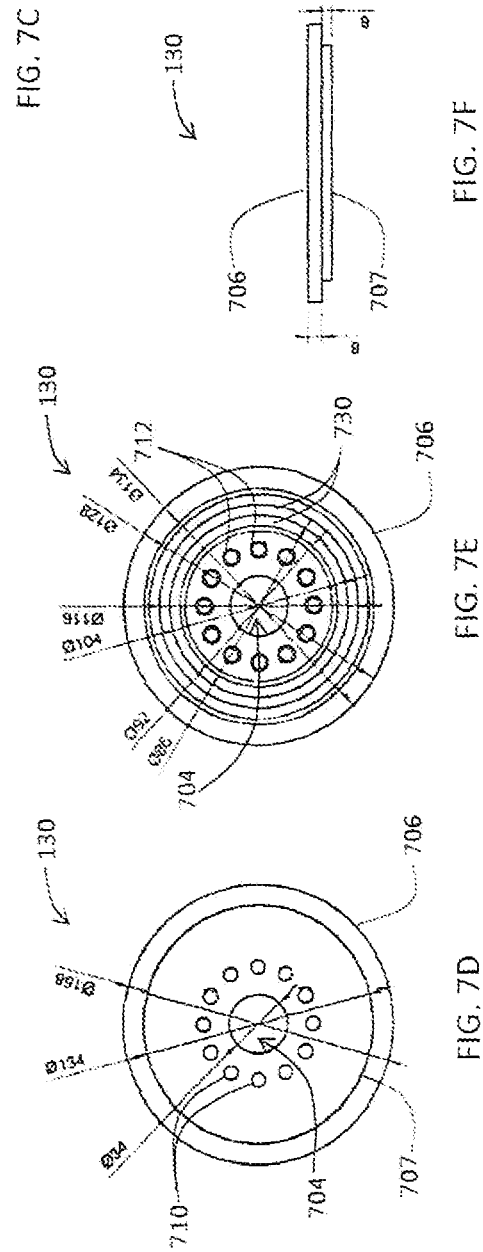

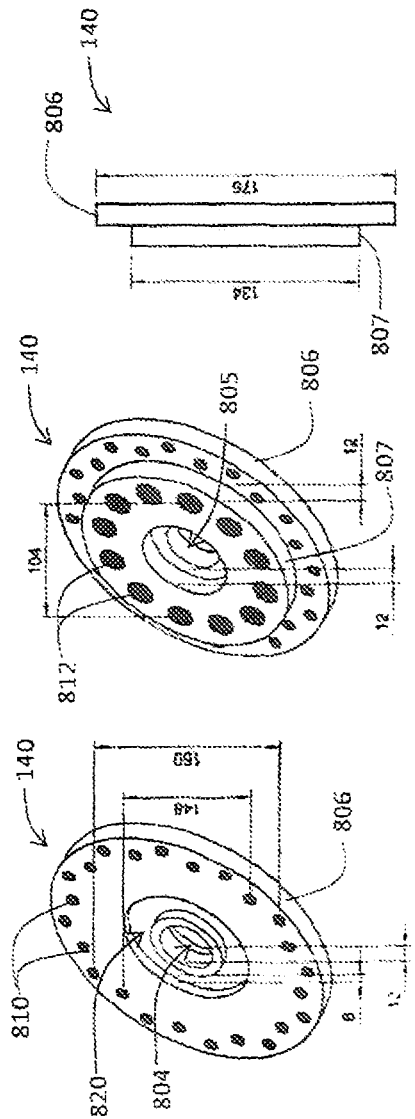
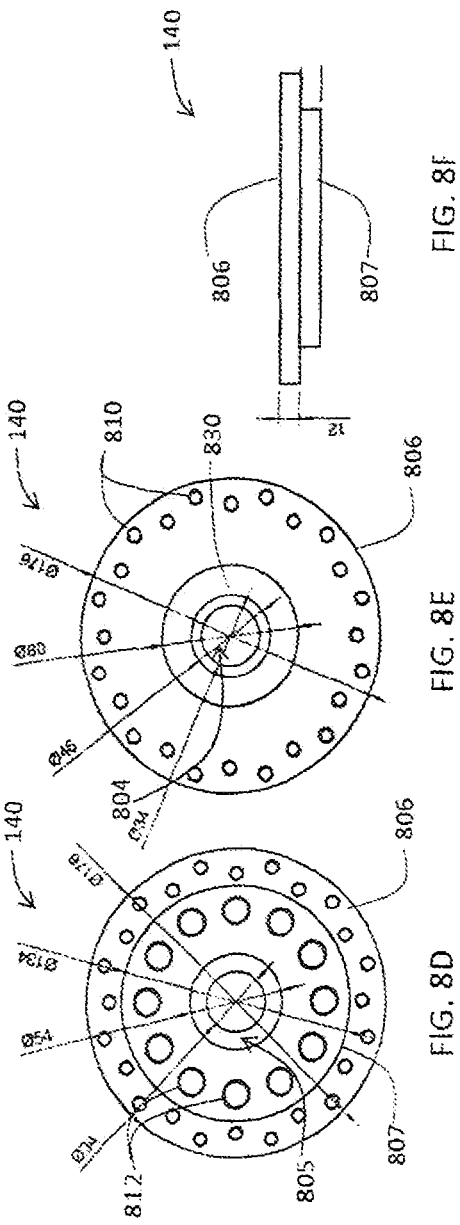

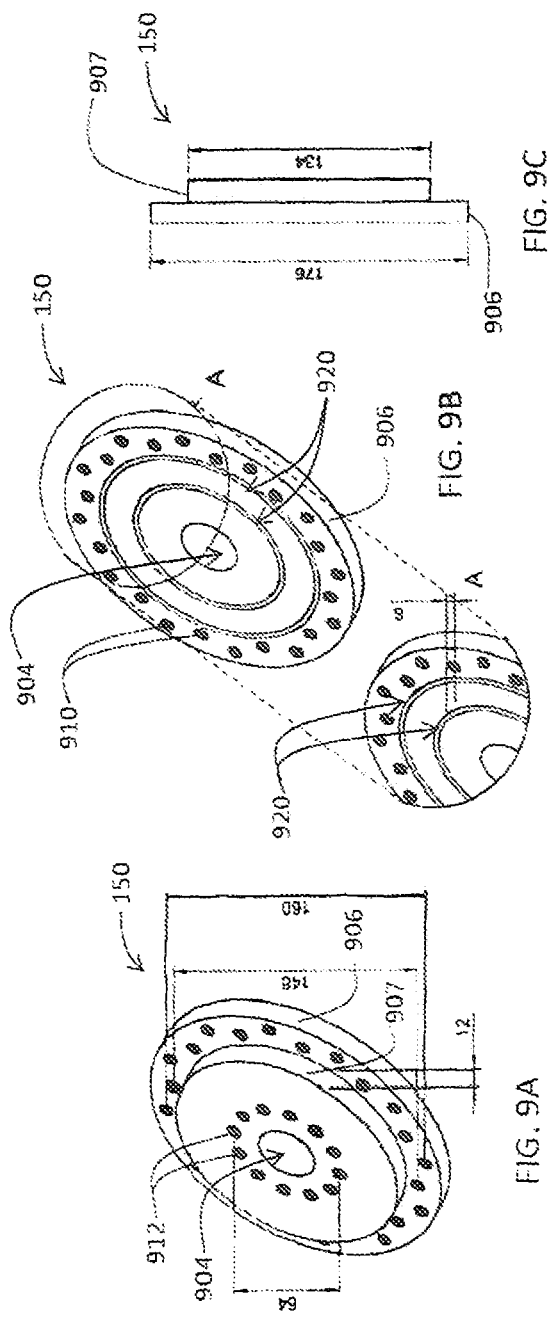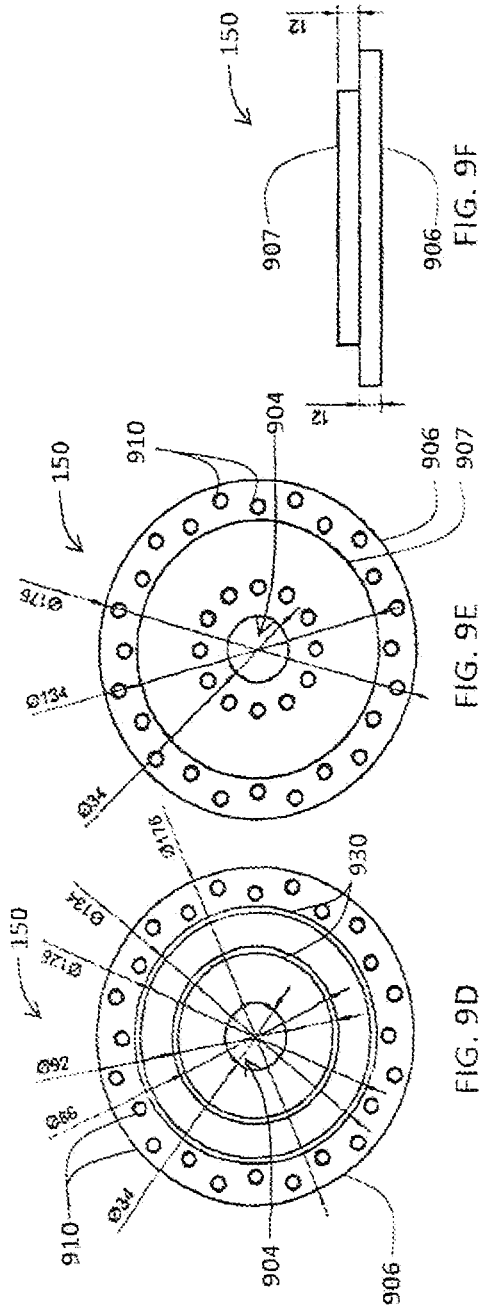

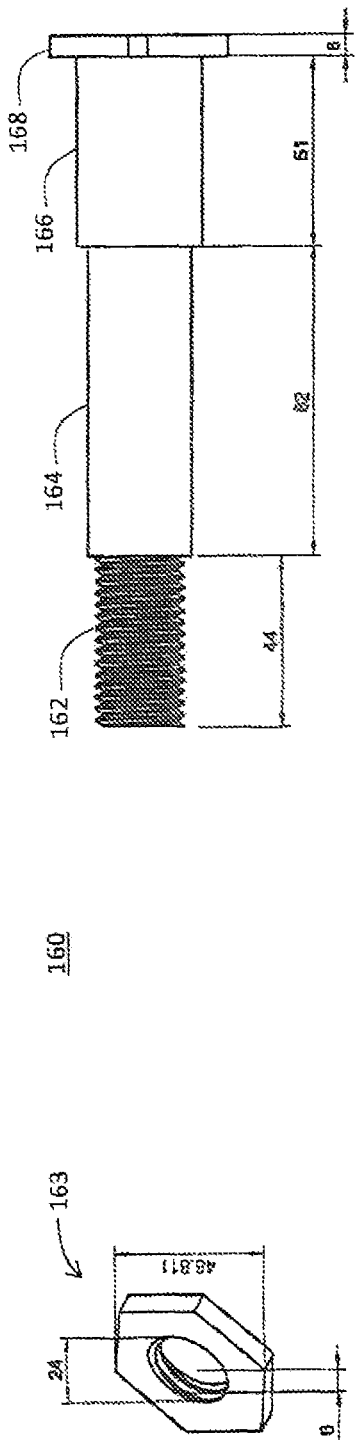
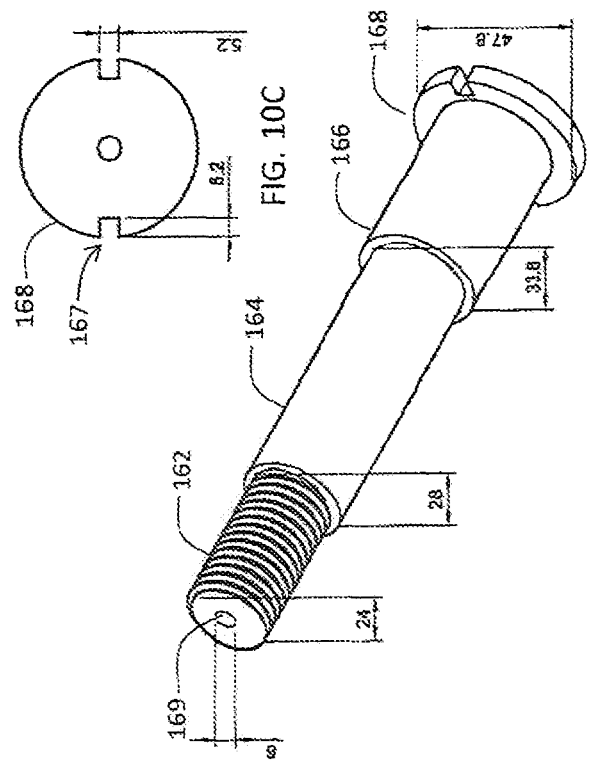
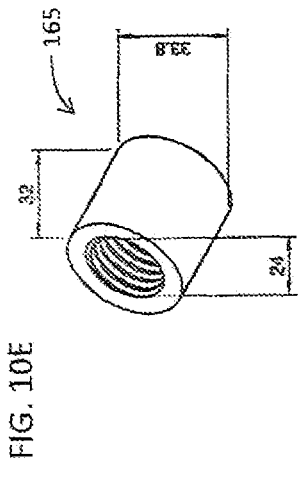
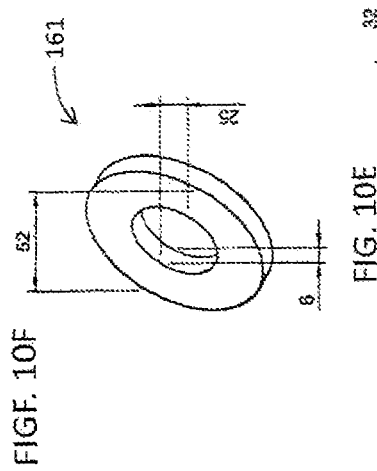
FIG. 10A
FIG. 10B
FIG. 10C
FIG. 10D
FIG. 10E
FIG. 10F

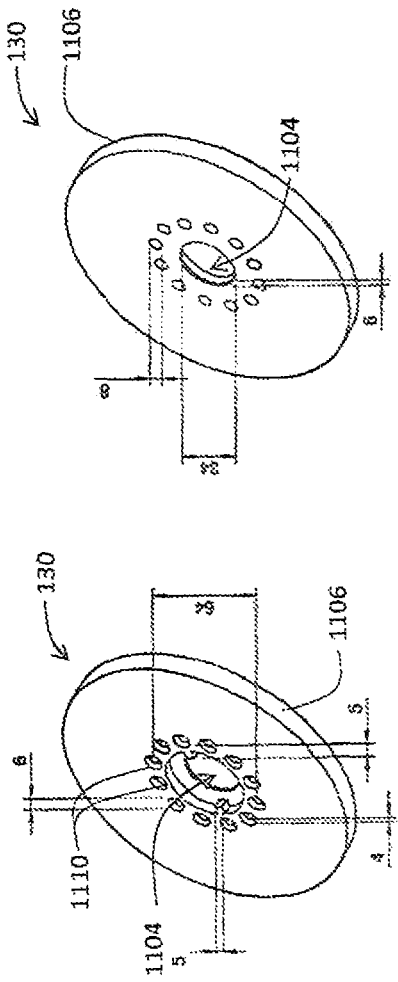
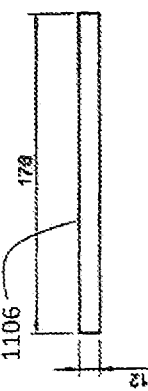
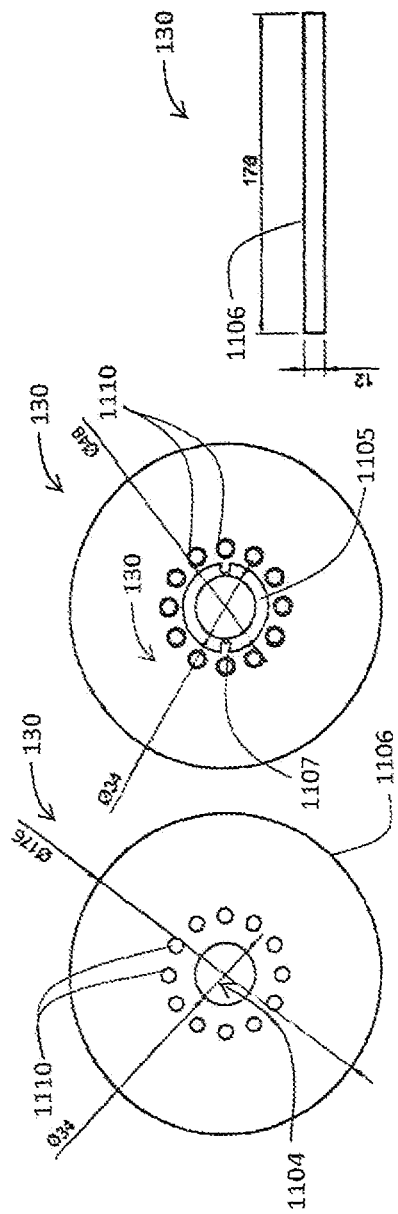
FIG. 11B
FIG. 11A
FIG. 11E
FIG. 11D
FIG. 11C

BEARINGLESS HUB ASSEMBLY WITH ELECTROMAGNETIC DRIVE SYSTEM AND ASSOCIATED METHODS

RELATED APPLICATIONS

This application is a continuation and claims the benefit under 35 U.S.C. § 120 of U.S. patent application Ser. No. 16/186,483 filed by the inventor of the present application on Nov. 9, 2018, and titled Bearingless Hub Assembly With Electromagnetic Drive System And Associated Methods, the entire contents of which are incorporated herein by reference except to the extent that disclosure therein is inconsistent with disclosure herein.

FIELD OF THE INVENTION

The present invention relates to magnetic bearing technology and, more specifically, to an electromagnetic hub assembly configured to support a load using magnetic levitation, and associated methods of operation and manufacture.

BACKGROUND OF THE INVENTION

A magnetic bearing is a type of bearing that supports a load using magnetic levitation. Magnetic bearings support moving parts without physical contact. For instance, magnetic bearings are able to levitate a rotating shaft and permit relative motion with very low friction and no mechanical wear. Magnetic bearings support the highest speeds of all kinds of bearing and have no maximum relative speed.

Active bearings have several advantages. For example, such bearings do not suffer from wear, have low friction, and can often accommodate irregularities in the mass distribution automatically, allowing rotors to spin around their center of mass with very low vibration.

Passive magnetic bearings use permanent magnets and, therefore, do not require any input power. However, passive magnetic bearings are difficult to design due to the limitations described by Earnshaw's theorem. Techniques using diamagnetic materials are relatively undeveloped and strongly depend on material characteristics. As a result, most magnetic bearings known in the art are active magnetic bearings that use electromagnets which require continuous power input and an active control system to keep the load stable. In a combined design, permanent magnets are often used to carry the static load and the active magnetic bearing is used when the levitated object deviates from its optimum position. Magnetic bearings typically require a back-up bearing in the case of power or control system failure.

Magnetic bearings are used in several industrial applications such as electrical power generation, petroleum refinement, machine tool operation and natural gas handling. They are also used in Zippe-type centrifuges for uranium enrichment and in turbomolecular pumps, where oil-lubricated bearings would be a source of contamination.

Therefore, there is a need for improvements in the design of magnetic bearings to achieve the advantages of such designs while reducing the complexity (and, therefore, the cost) of manufacturing such devices.

This background information is provided to reveal information believed by the applicant to be of possible relevance to the present invention. No admission is necessarily intended, nor should be construed, that any of the preceding description constitutes prior art against the present invention.

BRIEF SUMMARY OF THE INVENTION

With the above in mind, embodiments of the present invention are related to a bearingless hub assembly that virtually eliminates friction from applications involving a powered wheel. The present design may advantageously replace an internal-combustion engine, thereby dramatically reducing emissions by eliminating the use of fossil fuels, while still producing 100% of the host vehicle's power. The present design may also eliminate the chemicals and reduce the maintenance requirements of traditional engines, and at the same time may allow vehicle designers to reconfigure vehicle interiors for a more versatile body structure to accommodate more passengers, equipment and/or cargo.

In one embodiment, the present invention may comprise the following components: a rim including embedded magnets and a tube magnet inserted through an axial core; front and rear rim caps with embedded magnets; a front-drive plate with embedded magnets, forward and reverse electromagnetic actuators, forward and reverse levitation control units, power generators, and a hubcap; a component mounting plate with upper and lower control arms, the secondary electronic brake system, and the electronic steering pistons; and a spindle assembly with a sleeve magnet, threaded insert, washer, and nut.

More specifically, the axial rim core may be hollowed to receive a tube magnet. The series of magnets embedded around a circumference of both ends of the rim may be capped by front and rear plates configured to hold the inserted magnets in place (e.g., using a series of fasteners through the outward faces of the plates). The front rim cap and rear rim cap may also be fitted to receive annular magnets configured to maintain the space between them and the corresponding front or rear drive plates. The front and rear drive plates may carry forward and reverse electromagnetic actuators as well as forward and reverse levitation control units, power generators and speed sensors. These components may mount 360 degrees around the circumference of the drive plates while the embedded magnets of the rim spin through when in motion. The front and rear drive plates may be fitted to receive the same style magnets as the corresponding front or rear rim cap, causing the respective magnets to repel each other and allowing the rim and tire assembly to move freely with no friction.

Mounted to the outward side of the front drive plate may be a hubcap serving as a dust cover and protection for electronics underneath. Mounted to the rear drive plate may be a component mounting plate, which may include mounting points for upper and lower control arms, a secondary electronic brake system, and electronic steering pistons. The component mounting plate may serve to connect the assembly to a vehicle chassis by way of the upper and lower control arms. This component mounting plate also may carry the spindle assembly, which may project through the center of the rim and the other components in the assembly, holding them together with the center nut, washer, and spindle insert. The sleeve magnet of the spindle assembly may be positioned around the threaded insert and held in place. When inserted into the hollowed core of the rim, the sleeve magnet may repel the tube magnet of the rim, thus keeping space between the two components and allowing the wheel to spin freely.

The system may be powered in forward and reverse by electromagnets within the forward and reverse electromagnetic actuators. Using a series of off/on pulses to push the embedded magnets of the rim, these electromagnets may be operated by electromagnetic controllers and the vehicle's computer system, using the speed sensors and a driver's physical responses to control the acceleration and braking of the vehicle. The computer for such operation may be housed within the frame of the vehicle chassis along with the vehicle's rechargeable battery source. The chassis of the vehicle may be connected to the lower control arm and the body may be connected to the upper control arm while the chassis and the body may be held separate by a magnetic plate serving as magnetic suspension for the vehicle.

BRIEF DESCRIPTION OF THE DRAWINGS

FIG. 5A is a front perspective view of an exemplary rim core of the magnetic bearing device of FIGS. 1 through 4.

FIG. 5B is a rear perspective view of an exemplary rim core of the magnetic bearing device of FIGS. 1 through 4.

FIG. 5C is a vertical side view of an exemplary rim core of the magnetic bearing device of FIGS. 1 through 4.

FIG. 5D is a front view of an exemplary rim core of the magnetic bearing device of FIGS. 1 through 4.

FIGS. 5E and 5G are rear views of an exemplary rim core of the magnetic bearing device of FIGS. 1 through 4.

FIG. 5F is a horizontal side view of an exemplary rim core of the magnetic bearing device of FIGS. 1 through 4.

FIG. 6A is a front perspective view of an exemplary front rim cap of the magnetic bearing device of FIGS. 1 through 4.

FIG. 6B is a rear perspective view of an exemplary front rim cap of the magnetic bearing device of FIGS. 1 through 4.

FIG. 6C is a vertical side view of an exemplary front rim cap of the magnetic bearing device of FIGS. 1 through 4.

FIG. 6D is a front view of an exemplary front rim cap the magnetic bearing device of FIGS. 1 through 4.

FIG. 6E is a rear view of an exemplary front rim cap of the magnetic bearing device of FIGS. 1 through 4.

FIG. 6F is a horizontal side view of an exemplary front rim cap of the magnetic bearing device of FIGS. 1 through 4.

FIG. 7A is a front perspective view of an exemplary rear rim cap of the magnetic bearing device of FIGS. 1 through 4.

FIG. 7B is a rear perspective view of an exemplary rear rim cap of the magnetic bearing device of FIGS. 1 through 4.

FIG. 7C is a vertical side view of an exemplary rear rim cap of the magnetic bearing device of FIGS. 1 through 4.

FIG. 7D is a front view of an exemplary rear rim cap the magnetic bearing device of FIGS. 1 through 4.

FIG. 7E is a rear view of an exemplary rear rim cap of the magnetic bearing device of FIGS. 1 through 4.

FIG. 7F is a horizontal side view of an exemplary rear rim cap of the magnetic bearing device of FIGS. 1 through 4.

FIG. 8A is a front perspective view of an exemplary front drive plate of the magnetic bearing device of FIGS. 1 through 4.

FIG. 8B is a rear perspective view of an exemplary front drive plate of the magnetic bearing device of FIGS. 1 through 4.

FIG. 8C is a vertical side view of an exemplary front drive plate of the magnetic bearing device of FIGS. 1 through 4.

FIG. 8D is a front view of an exemplary front drive plate the magnetic bearing device of FIGS. 1 through 4.

FIG. 8E is a rear view of an exemplary front drive plate of the magnetic bearing device of FIGS. 1 through 4.

FIG. 8F is a horizontal side view of an exemplary front drive plate of the magnetic bearing device of FIGS. 1 through 4.

FIG. 9A is a front perspective view of an exemplary rear drive plate of the magnetic bearing device of FIGS. 1 through 4.

FIG. 9B is a rear perspective view of an exemplary rear drive plate of the magnetic bearing device of FIGS. 1 through 4.

FIG. 9C is a vertical side view of an exemplary rear drive plate of the magnetic bearing device of FIGS. 1 through 4.

FIG. 9D is a front view of an exemplary rear drive plate the magnetic bearing device of FIGS. 1 through 4.

FIG. 9E is a rear view of an exemplary rear drive plate of the magnetic bearing device of FIGS. 1 through 4.

FIG. 9F is a horizontal side view of an exemplary rear drive plate of the magnetic bearing device of FIGS. 1 through 4.

FIG. 10A is a perspective view of a threaded insert of an exemplary spindle assembly of the magnetic bearing device of FIGS. 1 through 4.

FIG. 10B is a side view of the threaded insert of FIG. 10A.

FIG. 10C is a top view of the threaded insert of FIG. 10A.

FIG. 10D is a perspective view of an exemplary sleeve magnet of an exemplary spindle assembly of the magnetic bearing device of FIGS. 1 through 4.

FIG. 10E is a perspective view of an exemplary washer of an exemplary spindle assembly of the magnetic bearing device of FIGS. 1 through 4.

FIG. 10F is a perspective view of an exemplary nut of an exemplary spindle assembly of the magnetic bearing device of FIGS. 1 through 4.

FIG. 11A is a front perspective view of an exemplary component mounting plate of the magnetic bearing device of FIGS. 1 through 4.

FIG. 11B is a rear perspective view of an exemplary component mounting plate of the magnetic bearing device of FIGS. 1 through 4.

FIG. 11C is a front view of an exemplary component mounting plate the magnetic bearing device of FIGS. 1 through 4.

FIG. 11D is a rear view of an exemplary component mounting plate of the magnetic bearing device of FIGS. 1 through 4.

FIG. 11E is a horizontal side view of an exemplary component mounting plate of the magnetic bearing device of FIGS. 1 through 4.

DETAILED DESCRIPTION OF THE INVENTION

Figure 1:
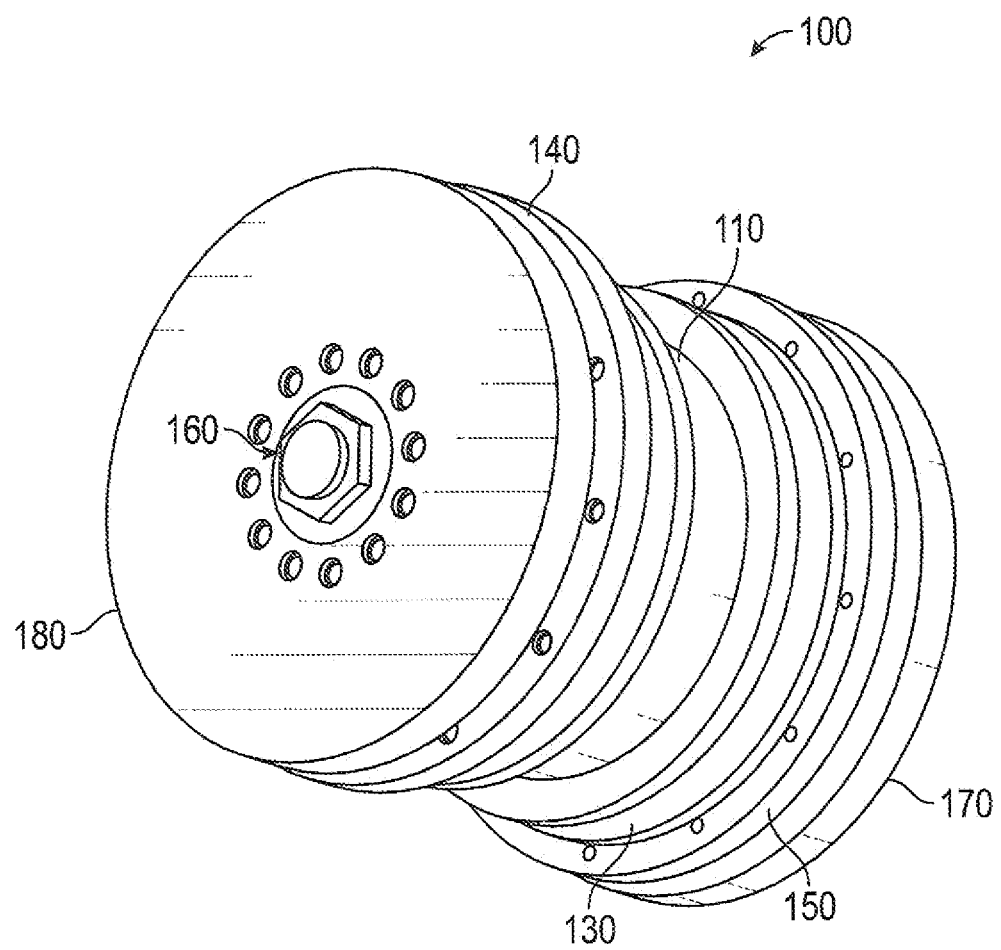
FIG. 1 is an assembled front perspective view of an exemplary embodiment of a magnetic bearing device of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Embodiments of the present invention may be designed to replace the wheel bearing and drive system in vehicles which may advantageously eliminate use of fossil fuels while creating dramatically-increased mileage and largely eliminating speed barriers, as well as creating a replacement for certain characteristics of modern vehicles, including the complete drivetrain, exhaust system, mechanical steering hydraulic brakes, cooling system, and modern suspension.

Referring to FIGS. 1, 2, 3, 4, 5A-5G, 6A-F, 7A-F, 8A-F, 9A-9F, 10A-10F, 11A-11E, 12, and 13, embodiments of a bearingless hub assembly will now be described. Generally, a bearingless hub assembly may comprise the following components: a rim, front and rear rim caps, front and rear drive plates, a component mounting plate, and a front hub cap. The bearingless hub assembly may be constructed in layers by being stacked on a spindle configured to hold the aforementioned components in line axially. The front and rear caps may be fastened directly to respective sides of the rim, the entirety of which may then be positioned between the front and rear drive plates (noting that such positioning is based not on mechanical connection, but instead by magnetism-induced levitation to create spacing both while on the spindle and while in active use). The hub cap and the component mounting plate may mechanically attach directly to the front and rear drive plates, respectively. A spindle nut may axially secure the aforementioned stacked components onto a threaded insert of a spindle assembly. The component mounting plate may mechanically connect the whole bearingless hub assembly to a vehicle.

Figure 2:
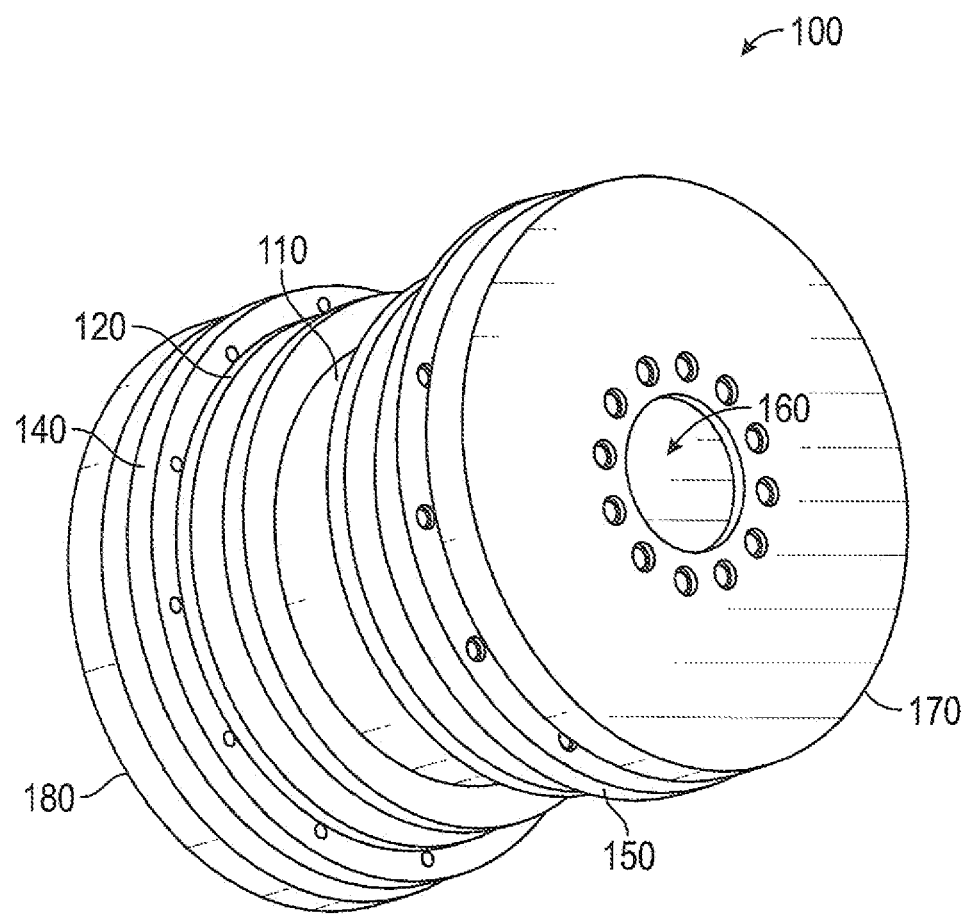
FIG. 2 is an assembled rear perspective view of an exemplary embodiment of a magnetic bearing device of the present invention.
Figure 3:
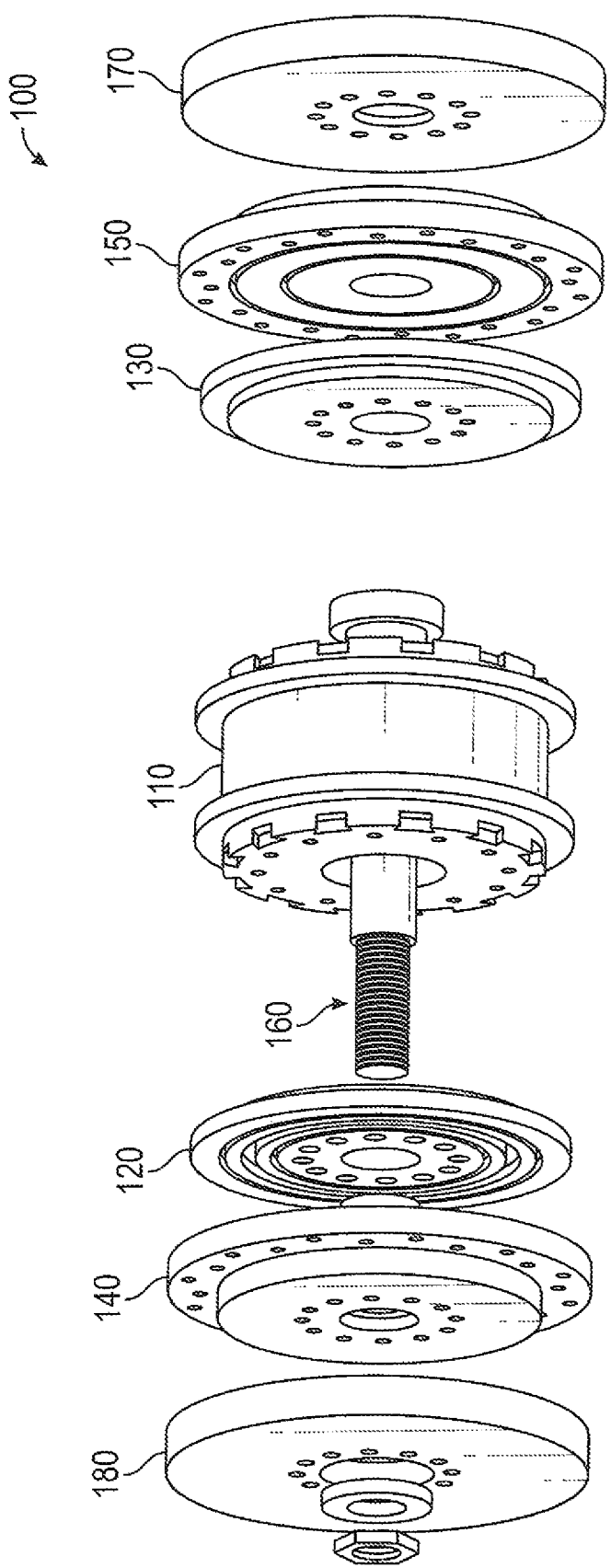
FIG. 3 is an exploded front perspective view of an exemplary embodiment of a magnetic bearing device of the present invention.
Figure 4:
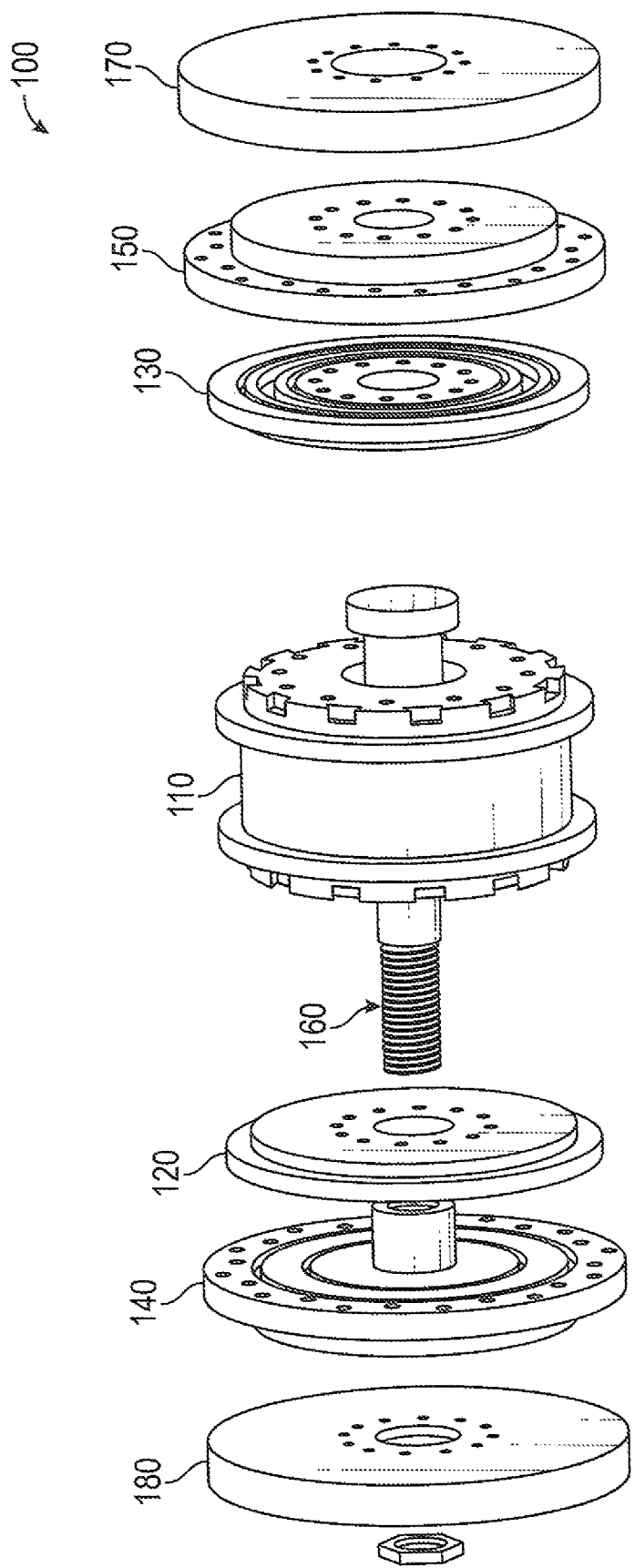
FIG. 4 is an exploded rear perspective view of an exemplary embodiment of a magnetic bearing device of the present invention.
Figure 5G:
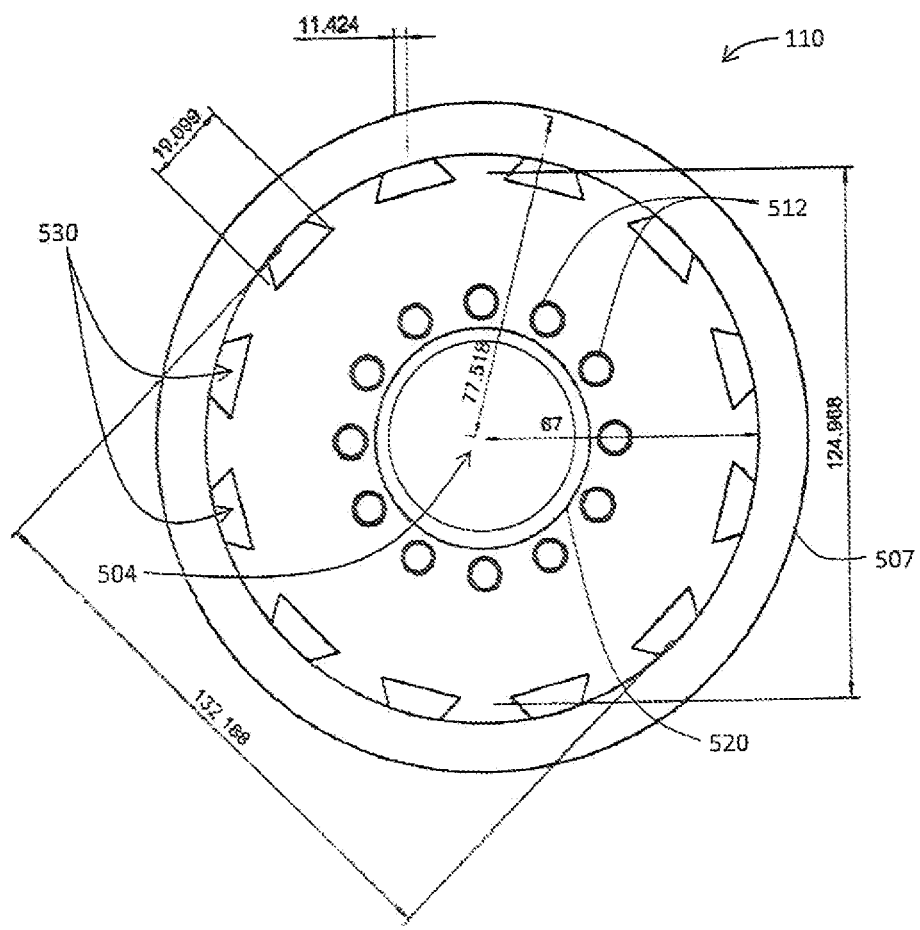

More specifically, FIG. 1 (front perspective) and FIG. 2 (rear perspective) illustrate assembled views of an embodiment of the bearingless hub assembly 100. FIG. 3 (front perspective) and FIG. 4 (rear perspective) illustrate exploded views of the bearingless hub assembly 100 of FIGS. 1 and 2. For example, and without limitation, the bearingless hub assembly 100 may comprise a rim 110, a front rim cap 120, a rear rim cap 130, a front drive plate 140, a rear drive plate 150, a spindle assembly 160, a component mounting plate 170, and a hub cap 180.

Referring now to FIGS. 5A, 5B, 5C, 5D, 5E, 5F, and 5G, a rim 110 according to an embodiment of the present invention will now be discussed in detail. For example, and without limitation, the rim 110 may comprise a substantially cylindrical body 500 with an axially centered rim center hole 504. The rim center hole 504 may be sized to receive a tube magnet 520. Magnet slots 502 may be disposed substantially equally about the circumferences of both outer and inner ends of the cylindrical body 500. For example, and without limitation, each of the magnet slots 502 may be routed into the cylindrical body 500 at a depth designed to fittedly receive a respective embedded magnet 530. As shown in FIGS. 5A, 5B, 5D, 5E, and 5G, the magnet slots 502 may be characterized by a dovetail shape to advantageously limit movement of the embedded magnets 530 during rotation of the rim 110.

The rim 110 may further comprise annular body extensions 506, 507 projecting radially outward from the cylindrical body 500 and positioned at axial distances from the ends of the cylindrical body 500 designed not to obstruct the magnet slots 502. The outer annular body extension 506 and the inner annular body extension 507, and an exposed curved surface of the cylindrical body 500 therebetween, may define a tire mount region 508 configured to advantageously receive a tire.

Also for example, and without limitation, the rim 110 may further comprise rim outer bolt holes 510 extending into the cylindrical body 500 from the outer end and disposed substantially equally about a circumference of the outer end. The rim 110 may further comprise rim inner bolt holes 512 extending into the cylindrical body 500 from the inner end and disposed substantially equally about a circumference of the rim center hole 504.

In certain embodiments, for example, and without limitation, component specifications of the rim 110 may include the following (measurement units in centimeters):

Bolt hole 510, 512 diameters: 8
Bolt hole 510, 512 threads: 8×1.25
Bolt hole 510, 512 depth: 12
Center hole 504 depth: 82
Cylindrical body 500 diameter: 134
Annular body extensions 506, 507 diameter: 158
Extensions 506, 507 from circumference of body 500: 24
Cylindrical body 500 length: 82
Extensions 506, 507 length: 50
Extensions 506, 507 internal groove: 12
Extensions 506, 507 internal lip thickness: 12
Extensions 506, 507 width: 8
Extensions 506, 507 from ends of body 500: 12
Magnet slot depth: 6
Tolerance: +0; −0.02

In yet another embodiment, the cylindrical body 500 of the rim 110 may be assembled rather than monolithically composed. For example, and without limitation, a split configuration of the cylindrical body 500 may comprise a front body portion that presents an outer end into which a first subset of the magnet slots 502 are routed, and also rear body portion that presents an inner end into which a second subset of the magnet slots 502 are routed. A front connection surface positioned opposite the outer end of the front body portion of the split cylindrical body 500 may be configured to flush mount, using some number of fasteners, to a rear connection surface positioned opposite the inner end of the rear body portion of the split cylindrical body 500. For example, and without limitation, the fasteners of the rim 100 may comprise a dowel pin protruding from the front connection surface of the front body portion of the split cylindrical body 500 and a dowel hole, configured to fittedly receive the dowel pin, extending into the rear connection surface of the rear body portion of the split cylindrical body 500. Such a split rim design may advantageously allow for a manufacturer to mill a lip which holds a tire in place from a straight on position versus a 90 degree angle. This design may also advantageously allow a tire to be mounted to the rim 110 without machinery or a great amount of effort.

Referring now to FIGS. 6A, 6B, 6C, 6D, 6E and 6F, a front rim cap 120 according to an embodiment of the present invention will now be discussed in detail. For example, and without limitation, the front rim cap 120 may comprise a first front rim cap cylindrical base 606 positioned coaxial to and flush-mounted to a second front rim cap cylindrical base 607 (e.g., either mounted using fasteners, or formed monolithically). For example, and without limitation, the first front rim cap cylindrical base 606 may be of greater diameter than the second front rim cap cylindrical base 607. The front rim cap 120 may further comprise a front rim cap center hole 604 axially centered through the front rim cap 120, a front rim cap ring magnet 603, and a front rim cap annular groove 602 axially centered in the first front rim cap cylindrical base 606 and having an inner diameter greater than a diameter of the front rim cap center hole 604. The front rim cap annular groove 602 may be configured to fittedly receive the front rim cap ring magnet 603.

Also for example, and without limitation, the front rim cap 120 may further comprise front rim bolt counterbores 612 extending from the first front rim cap cylindrical base 606 through the second front rim cap cylindrical base 607. The counterbores 612 may be disposed substantially equally about a circumference of the second front rim cap cylindrical base 607.

In certain embodiments, for example, and without limitation, component specifications of the front rim cap 120 may include the following (measurement units in centimeters):

Counterbores 612 diameters: 10
Counterbores 612 depth: 4
Bolt holes 601 diameter: 8
Bolt holes 601 depth: 10
Bolt holes 601 center to center: 104
Center hole 604 depth: 14
Annular magnet groove 602 depth: 6
Tolerance: +0, −0.02

Referring now to FIGS. 7A, 7B, 7C, 7D, 7E and 7F, a rear rim cap 130 according to an embodiment of the present invention will now be discussed in detail. For example, and without limitation, the rear rim cap 130 may comprise a first rear rim cap cylindrical base 706 positioned coaxial to and flush-mounted to a second rear rim cap cylindrical base 707 (e.g., either mounted using fasteners, or formed monolithically). For example, and without limitation, the first rear rim cap cylindrical base 706 may be of greater diameter than the second rear rim cap cylindrical base 707. The rear rim cap 130 may further comprise a rear rim cap center hole 704 axially centered through the rear rim cap 130, one or more rear rim cap ring magnets 730 and associated rear rim cap annular groove(s) 720 axially centered in the first rear rim cap cylindrical base 706 and each having a respective inner diameter greater than a diameter of the rear rim cap center hole 704. The rear rim cap annular groove(s) 720 may be configured to fittedly receive a respective one of the rear rim cap ring magnets 730.

Also for example, and without limitation, the rear rim cap 130 may further comprise rear rim bolt counterbores 712 extending from the first rear rim cap cylindrical base 706 through the second rear rim cap cylindrical base 707. The counterbores 712 may be disposed substantially equally about a circumference of the second rear rim cap cylindrical base 707.

In certain embodiments, for example, and without limitation, component specifications of the rear rim cap 130 may include the following (measurement units in centimeters):

Counterbores 712 diameters: 10
Counterbores 712 depth: 4
Bolt holes 710 diameter: 8
Bolt holes 710 depth: 10
Bolt holes 710 center to center: 64
Center hole 704 depth: 14
Annular magnet grooves 720 depth: 6
Tolerance: +0, −0.02

Referring now to FIGS. 8A, 8B, 8C, 8D, 8E and 8F, a front drive plate 140 according to an embodiment of the present invention will now be discussed in detail. For example, and without limitation, the front drive plate 140 may comprise a first front drive plate cylindrical base 806 positioned coaxial to and flush-mounted to a second front drive plate cylindrical base 807 (e.g., either mounted using fasteners, or formed monolithically). For example, and without limitation, the first front drive plate cylindrical base 806 may be of greater diameter than the second front drive plate cylindrical base 807. The front drive plate 140 may also comprise a first front drive center hole 804 axially centered in the first front drive plate cylindrical base 806, and also a second front drive center hole 805 axially centered in the second front drive plate cylindrical base 807. For example, and without limitation, the second front drive center hole 805 may be of greater diameter than the first front drive center hole 804. The front drive plate 140 may also comprise a front drive annular groove 820 axially centered in the first front drive plate cylindrical base 806 and having an inner diameter greater than a diameter of the first front drive center hole 804. The front drive annular groove 820 may be configured to fittedly receive a front drive plate ring magnet 830.

Also for example, and without limitation, the front drive plate 140 may comprise front drive outer bolt holes 810 in the first front drive plate cylindrical base 806 disposed substantially equally about a circumference of the first front drive plate cylindrical base 806. The front drive plate 140 may further comprise front drive inner bolt holes 812 in the second front drive plate cylindrical base 807 disposed substantially equally about a circumference of the second front drive plate cylindrical base 807. Referring again to FIGS. 1, 2, 3, and 4, the hubcap 180 may be fixedly mounted to an outward side of the front drive plate 140.

In certain embodiments, for example, and without limitation, component specifications of the front drive plate 140 may include the following (measurement units in centimeters):

Outer bolt holes 810 diameter: 8
Outer bolt holes 810 depth: 12
Outer bolt hole 810 thread: 8×1.25

Outer bolt holes 810 center to center: 160, 148
Inner bolt holes 812 diameter: 16
Inner bolt holes 812 depth: 12
Inner bolt hole 812 thread: 16×2.0
Inner bolt holes 812 center to center: 104
Center hole 804 diameter: 34
Center hole 804 depth: 12
Annular magnet groove 820 depth: 6
Nut & washer seat depth: 12
Tolerance: +0, −0.02

Referring now to FIGS. 9A, 9B, 9C, 9D, 9E and 9F, a rear drive plate 150 according to an embodiment of the present invention will now be discussed in detail. For example, and without limitation, the rear drive plate 150 may comprise a first rear drive plate cylindrical base 906 positioned coaxial to and flush-mounted to a second rear drive plate cylindrical base 907 (e.g., either mounted using fasteners, or formed monolithically). The first rear drive plate cylindrical base 906 may be of greater diameter than the second rear drive plate cylindrical base 907. The rear drive plate 150 may also comprise a rear drive plate center hole 904 axially centered through the rear drive plate 150, one or more rear drive plate ring magnets 930 and associated rear drive plate annular groove(s) 920 axially centered in the first rear drive plate cylindrical base 906 and each having a respective inner diameter greater than a diameter of the rear drive plate center hole 904. The rear drive plate annular groove(s) 920 may be configured to fittedly receive a respective one of the rear drive plate ring magnets 930.

Also for example, and without limitation, the rear drive plate 150 may comprise rear drive outer bolt holes 910 in the first rear drive plate cylindrical base 906 disposed substantially equally about a circumference of the first rear drive plate cylindrical base 906. The rear drive plate 150 may further comprise rear drive inner bolt holes 912 in the second rear drive plate cylindrical base 907 disposed substantially equally about a circumference of the second rear drive plate cylindrical base 907.

In certain embodiments, for example, and without limitation, component specifications of the rear drive plate 150 may include the following (measurement units in centimeters):

Outer bolt holes 910 diameter: 8
Outer bolt holes 910 depth: 12
Outer bolt hole 910 thread: 8×1.25
Outer bolt holes 910 center to center: 160, 148
Inner bolt holes 912 diameter: 8
Inner bolt holes 912 depth: 12
Inner bolt hole 912 thread: 8×1.25
Inner bolt holes 912 center to center: 64
Center hole 904 diameter: 34
Center hole 904 depth: 24
Annular magnet groove 920 depth: 6
Tolerance: +0, −0.02

Referring now to FIGS. 10A, 10B, 10C, 10D, 10E and 10F, a spindle assembly 160 according to an embodiment of the present invention will now be discussed in detail. For example, and without limitation, the spindle assembly 160 may comprise a threaded insert (e.g., as illustrated, a hex bolt) characterized by an externally-threaded fastening portion 162, a substantially-smooth narrow shank portion 164, a substantially-smooth wide shank portion 166, and an enlarged head portion 168 (e.g., a cylindrical cap). In one embodiment of the present invention, the threaded insert of the spindle assembly 160 may further comprise a spindle assembly hole 169 extending axially through the fastening portion 162, the narrow shank portion 164, the wide shank portion 166, and the enlarged head portion 168; and configured to receive a spindle to stabilize the spindle assembly during manufacture (e.g., stacking) of the aforementioned components of the bearingless hub assembly 100.

The spindle assembly 160 may further comprise a washer 161 having a central washer bore of greater diameter than the fastening portion 162 of the threaded insert, and also a center nut 163 having an internally-threaded nut bore configured to receive the fastening portion 162 of the threaded insert. Referring more specifically to FIG. 10D, the spindle assembly 160 may further comprise a sleeve magnet 165 having an internally-threaded sleeve bore configured to receive the fastening portion 162 of the threaded insert.

Referring now to FIGS. 11A, 11B, 11C, 11D, 11E and 11F, a component mounting plate 170 according to an embodiment of the present invention will now be discussed in detail. For example, and without limitation, the component mounting plate 170 may comprise a mounting plate cylindrical base 1106 characterized by a mounting base center hole 1104 axially centered through the component mounting plate 170. A spindle seat counterbore 1105 may be axially centered in the mounting plate cylindrical base 1106 about the mounting base center hole 1104 and may be configured to receive the enlarged head portion 168 of the spindle assembly 160. For example, and without limitation, the spindle seat counterbore 1105 may further comprise at least one cylinder bolt 1107 configured to fittedly engage a respective cylinder notch 167 (see FIG. 10) of the enlarged head portion 168 of the spindle assembly 160.

Also for example, and without limitation, the component mounting plate 170 may further comprise mounting plate bolt counterbores 1110 extending through the mounting plate cylindrical base 1106. The counterbores 1110 may be disposed substantially equally about an exterior circumference of the spindle seat counterbore 1105. Referring again to FIGS. 3 and 4, and continuing to refer to FIGS. 11A and 11E, the rear drive plate 150 may be configured to be fixedly mounted to the component mounting plate 170. Also for example, and without limitation, the component mounting plate 170 may further comprise a plurality of mounting points (not shown) configured to carry at least one of a secondary electronic brake system, an electronic steering piston, and an upper control arm and a lower control arm configured to mechanically connect the magnetic bearing assembly 100 to a vehicle chassis.

In certain embodiments, for example, and without limitation, component specifications of the component mounting plate 170 may include the following (measurement units in centimeters):

Counterbores 1110 diameters: 10
Counterbores 1110 depth: 4
Bolt holes 1110 diameter: 8
Bolt holes 1110 depth: 8
Bolt holes 1110 center to center: 64
Center hole 1104 depth: 6
Spindle seat 1105 depth: 6
Spindle seat notch 1107: 5×5
Tolerance: +0, −0.02

Assembled as described above, the present invention may advantageously replace a conventional motor with the described electromagnetic drive system as employed with the bearingless hub assembly 100. Incorporation of electronic steering and electronic braking systems may advantageously eliminate all mechanical linkage between the chassis and the wheel. Employment of the bearingless hub assembly 100 also may advantageously eliminate various systems of modern vehicle designs, including the complete drivetrain, exhaust system, mechanical steering, hydraulic brakes, cooling system and modern suspension. By replacing these systems, manufacturers may advantageously apply the bearingless hub assembly 100 to design more eco-friendly vehicles with more passenger space, cargo space and more space for equipment. This disclosed system 100 is also consumer-friendly, using fewer failure-prone parts and requiring minimal maintenance, thus advantageously making vehicle operation more cost-efficient.

In another embodiment, the same principle for propulsion described above may be employed except that, instead of the embedded magnets 530 of the rim 110 being read from the outer circumference of the rim 110, these magnets 530 may be embedded in the exact same spot and read from the outer circumference of the faces (e.g., ends) of the rim 110. The component mounting plate 170 may be adjusted to accommodate the forward and reverse electromagnetic actuators as well as forward and reverse levitation control units, power generators and speed sensors in such a manner that they read and operate the magnets 530 from a straight on position versus from a 90-degree position.

Any number of application-specific modifications to the rim may allow the present design 100 to be applied to a wide variety of vehicles, without venturing from the disclosure herein. Such applications may include, for example, and without limitation, helicopter and propeller aircraft modifications of the front and rear drive plates and component mounting plates; allowing this assembly 100 to be used for motorcycle wheels; and other modifications of the rim 110 and drive plates 140, 150 that may allow the system 100 to generate power through natural resources such as wind and water. In applications using natural resources, the electromagnetic aspect of the system 100 may be omitted, using instead natural resources to rotate the rim 110. Alternatively, the electromagnets may be replaced with power generators; such applications may be designed for creating energy.

Other alternative applications may advantageously employ the bearingless hub assembly 100, including: a) wheelchairs using magnetic suspension and capable of traveling off-road, b) terrain exploration vehicles operating in a space environment, and c) replacement/retrofit of any power generator or alternator, motor, or converter of fossil fuels to mechanical energy. The system 100 described herein may be employed to replace/retrofit any type of wheel operable to roll, spin, hinge, or turn on an axis (for example, and without limitation, a mechanical elbow).

Figure 12:
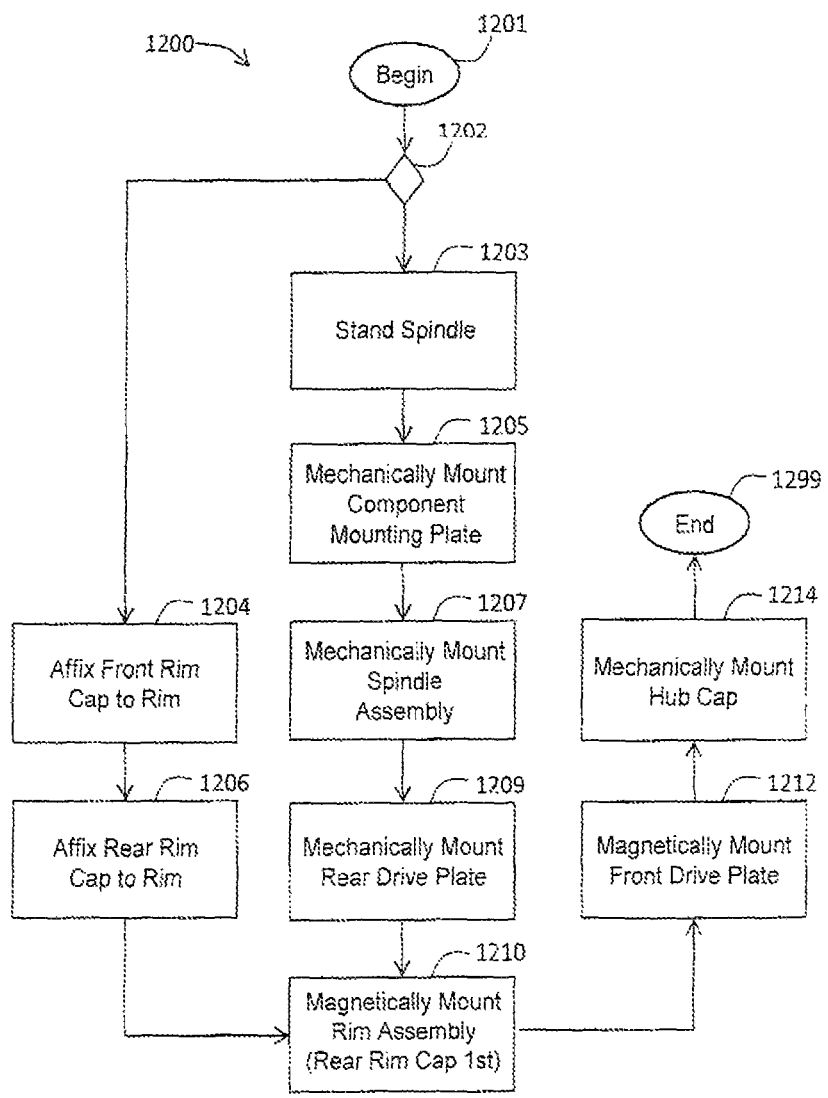
FIG. 12 is a flow chart illustrating an assembly method aspect according to an embodiment of the present invention.

Referring now to FIG. 12, a method aspect 1200 of manufacturing a bearingless hub assembly 100 according to an embodiment of the present invention will now be discussed in detail. From the start at Block 1201, a spindle (for example, a rod) may be positioned (at Block 1203) to support gravity-assisted stacking of components about the spindle. At Block 1205, the component mounting plate 170 may be mechanically mounted (e.g., stacked) on the spindle such that the spindle seat counterbore 1105 is facing axially upward in relation to the spindle. Then the spindle assembly 160 may be mounted such that the spindle projects through the spindle assembly hole 169 and the enlarged head portion 168 may anchor into the spindle seat counterbore 1105 of the component mounting plate 170 (Block 1207). Also at Block 1207, the sleeve magnet 165 may be positioned on the threaded insert of the spindle assembly 160. At Block 1209, the rear drive plate 150 may be mechanically mounted to the component mounting plate 170 such that the rear drive plate center hole 904 of the rear drive plate 150 may fittedly receive the threaded insert 164, 166 of the spindle assembly 160.

At person of skill in the art will immediately recognize that assembly of the front and rear rim caps 120, 130 to the rim 110, to define a rim assembly, may occur in parallel (see Block 1202) with the aforementioned steps in the component stacking process 1200. At Block 1204, the front rim cap 120 may be mechanically affixed to the rim 110. Similarly, at Block 1206, the rear rim cap 130 may be mechanically affixed to the rim 110. These two method steps may be interchanged and still operate to produce the rim assembly.

Still referring to FIG. 12, at Block 1210 the rim assembly may be magnetically mounted proximate the front drive plate 150 such that the rear rim cap center hole 704 of the rear rim cap plate 130 may fittedly receive the threaded insert 164, 166 of the spindle assembly 160. More specifically, the rear rim cap ring magnets 730 of the rear rim cap 130 of the rim 110 may repel the rear drive plate ring magnets 930 of the rear drive plate 150 to maintain spacing between these two components. Furthermore, the sleeve magnet 165 of the spindle assembly 160 may repel the tube magnet 520 of the rim 110 to maintain spacing between these two components. At Block 1212, the front drive plate 140 may be magnetically mounted proximate the front rim cap 120 such that the front drive plate center hole 804 of the front drive plate 140 may fittedly receive the threaded insert 162, 164 of the spindle assembly 160. More specifically, the front rim cap ring magnet 630 of the front rim cap 130 of the rim 110 may repel the front drive plate ring magnet 830 of the front drive plate 140 to maintain spacing between these two components. At Block 1214, the hub cap 180 may be mechanically mounted (e.g., fittedly receiving the threaded insert 164 of the spindle assembly 160 and anchored using the washer 161 and nut 163) before the process ends at Block 1299.

Figure 13:
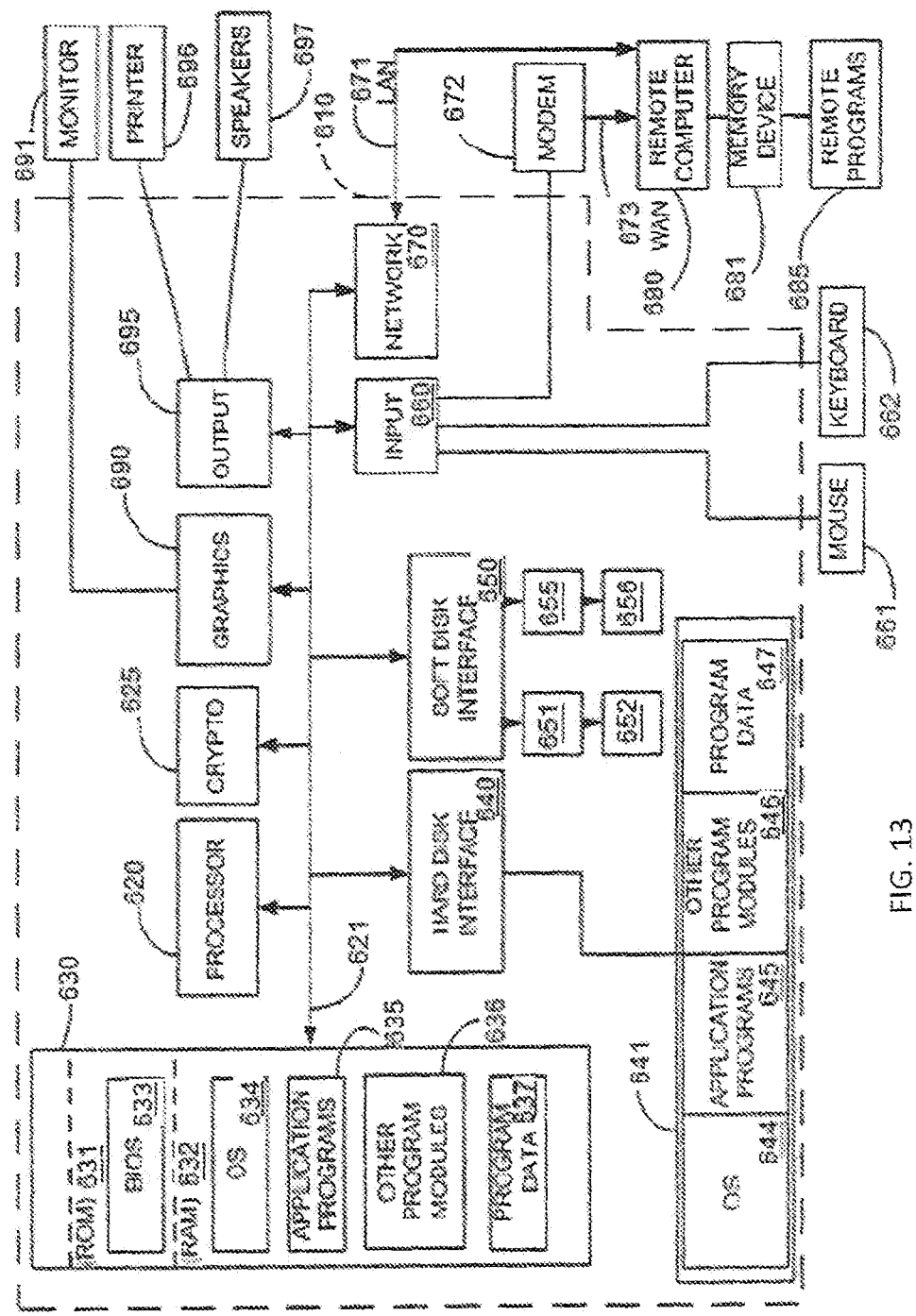
FIG. 13 a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 13 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 13 illustrates an operating system (OS) 634, application programs 635, other program modules 636, and program data 637.

The computer 610 may also include other removable/non-removable, volatile/nonvolatile computer storage media. By way of example only, FIG. 13 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 13, provide storage of computer readable instructions, data structures, program modules and other data for the computer 610. In FIG. 13, for example, hard disk drive 641 is illustrated as storing an OS 644, application programs 645, other program modules 646, and program data 647. Note that these components can either be the same as or different from OS 633, application programs 633, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 13. The logical connections depicted in FIG. 13 include a local area network (LAN) 671 and a wide area network (WAN) 673, but may also include other networks 140. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 13 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

That which is claimed is:

1. A magnetic bearing apparatus comprising:
    a rim comprising:
        a tube magnet,
        a cylindrical body characterized by an outer end and an inner end,
        a rim center hole axially centered through the cylindrical body and configured to fittedly receive the tube magnet, and
        a plurality of embedded magnets;
    a front rim cap comprising:
        a front rim cap center hole axially centered through the front rim cap, and
        a front rim cap ring magnet;
    a rear rim cap comprising:
        a rear rim cap center hole axially centered through the rear rim cap, and
        at least one rear rim cap loop magnet;
    a front drive plate comprising:
        a first front drive center hole axially centered in the front drive plate,
        a second front drive center hole axially centered in the front drive plate and opposite the first front drive center hole, and
        a front drive plate ring magnet;
    a rear drive plate comprising:
        a rear drive center hole axially centered through the rear drive plate, and
        at least one rear drive plate loop magnet; and
    a spindle assembly comprising:
        a threaded insert characterized by a fastening portion comprising an externally-threaded cylinder having first and second ends, and
        a sleeve magnet having an internally-threaded sleeve bore configured to receive the fastening portion of the threaded insert from the second end of the externally-threaded cylinder;
    wherein the front rim cap is fixedly mounted to the outer end of the cylindrical body of the rim and configured to secure, in relation to the rim, an outer subset of the plurality of embedded magnets disposed about the outer end of the cylindrical body;
    wherein the rear rim cap is fixedly mounted to the inner end of the cylindrical body of the rim and configured to secure, in relation to the rim, an inner subset of the plurality of embedded magnets disposed about the inner end of the cylindrical body;
    wherein the spindle assembly is positioned to extend, starting from the second end of the fastening portion of the threaded insert, through the rear drive center hole of the rear drive plate, the rear rim cap center hole of the rear rim cap, the rim center hole of the rim, the front rim cap center hole of the front rim cap, and the first and second front drive center holes of the front drive plate, in turn, such that
        a respective first substantially similar polarity of the tube magnet and the sleeve magnet create a first repel force that operates to freely mount the front rim center hole of the rim proximate to the threaded insert of the spindle assembly at a first levitation spacing of the first repel force,
        a respective second substantially similar polarity of the front rim cap ring magnet and the front drive plate ring magnet create a second repel force that operates to freely mount the front rim cap proximate to the front drive plate at a second levitation spacing of the second repel force, and
        a respective third substantially similar polarity of the at least one rear rim cap loop magnet and the at least one rear drive plate loop magnet create a third repel force that operates to freely mount the rear rim cap proximate to the rear drive plate at a third levitation spacing of the third repel force.

2. The magnetic bearing apparatus according to claim 1 wherein the cylindrical body of the rim further comprises:
    a front body portion including the outer end and a front connection surface opposite the outer end, and
    a rear body portion including the inner end and a rear connection surface opposite the inner end;
    wherein the rim further comprises at least one fastener configured to flush-mount the front connection surface of the front body portion to the rear connection surface of the rear body portion.

3. The magnetic bearing apparatus according to claim 2 wherein the at least one fastener of the rim further comprises a dowel pin protruding from the front connection surface of the front body portion and a dowel hole extending into the rear connection surface of the rear body portion and configured to fittedly receive the dowel pin.

4. The magnetic bearing apparatus according to claim 1 wherein the rim further comprises a plurality of magnet slots disposed about the outer end and the inner end of the cylindrical body at a magnet slot depth and configured to fittedly receive a respective one of the plurality of embedded magnets.

5. The magnetic bearing apparatus according to claim 4 wherein the rim further comprises:

an outer annular body extension projecting radially outward from the cylindrical body and positioned at a first axial distance from the outer end greater than the magnet slot depth, and an inner annular body extension projecting radially outward from the cylindrical body and positioned at a second axial distance from the inner end greater than the magnet slot depth;

wherein the outer annular body extension and the inner annular body extension, and an exposed curved surface of the cylindrical body therebetween, define a tire mount region.

6. The magnetic bearing apparatus according to claim 1 wherein at least one of the front drive plate and the rear drive plate is further configured to carry at least one motion control component mounted about a circumference thereof, the at least one motion control component selected from the group consisting of an electromagnetic actuator, a levitation control unit, and a speed sensor.

7. The magnetic bearing apparatus according to claim 6 wherein the electromagnetic actuator is positioned at one of the outer end and the inner end of the rim, defined as a powered end, and proximate to a circumference of the cylindrical body at the powered end of the rim; wherein an electromagnetic field of the electromagnetic actuator and a respective polarity of a subset of the plurality of embedded magnets at the powered end create a rotational force that operates to freely spin the rim about an axis of the rim in a spin direction defined by the electromagnetic field.

8. The magnetic bearing apparatus according to claim 1, wherein the spindle assembly further comprises a shank portion having a first substantially-smooth cylinder of greater diameter than the externally-threaded cylinder and coupled to the first end of the fastening portion, and an enlarged head portion comprising a cylindrical cap of greater diameter than the first substantially-smooth cylinder, and coupled to the shank portion opposite the fastening portion; and further comprising a component mounting plate comprising:

a mounting plate cylindrical base; and a spindle seat counterbore axially centered in the mounting plate cylindrical base and configured to receive the enlarged head portion of the spindle assembly.

9. The magnetic bearing apparatus according to claim 8 wherein:

the cylindrical cap of the enlarged head portion of the spindle assembly further comprises at least one cylinder notch; and the component mounting plate further comprises at least one cylinder bolt each configured to fittedly engage a respective one of the at least one cylinder notch of the enlarged head portion of the spindle assembly.

10. The magnetic bearing assembly according to claim 8 wherein the rear drive plate is fixedly mounted to the component mounting plate; and wherein the component mounting plate further comprises a plurality of mounting points configured to carry at least one of a secondary electronic brake system, at least one electronic steering piston, and an upper control arm and a lower control arm, wherein the upper and lower control arms are configured to mechanically connect the magnetic bearing assembly to a vehicle chassis.

11. The magnetic bearing assembly according to claim 1 further comprising a hubcap fixedly mounted to an outward side of the front drive plate.

12. A bearingless hub assembly comprising:

a component mounting plate;

a spindle assembly mechanically mounted to the component mounting plate;

a rear drive plate mechanically mounted to the spindle assembly;

a front rim cap and a rear rim cap mechanically mounted to respective ends of a rim, to define a rim assembly, wherein the rim assembly is magnetically mounted proximate the rear drive plate using a first repel force and a second repel force; and a front drive plate magnetically mounted proximate the rim assembly using the first repel force and a third repel force;

wherein the component mounting plate, the spindle assembly, the rear drive plate, the rim assembly, and the front drive plate are characterized by a common axis;

wherein a respective substantially similar pole of a sleeve magnet of the spindle assembly and a tube magnet of the rim create the first repel force;

wherein a respective substantially similar pole of at least one rear rim cap ring magnet of the rim and at least one rear drive plate magnet of the rear drive plate create the second repel force; and wherein a respective substantially similar pole of at least one front rim cap ring magnet of the rim and at least one front drive plate magnet of the front drive plate create the third repel force.

13. The bearingless hub assembly according to claim 12 wherein the rim further comprises a plurality of magnet slots disposed about an outer end and an inner end of the rim and configured to fittedly receive a respective one of a plurality of embedded magnets; and further comprising at least one levitation control magnet of at least one levitation control unit magnetically mounted proximate a perimeter of the rim such that a respective substantially similar pole of the embedded magnets and the respective at least one levitation control magnet create a fourth repel force.

14. The bearingless hub assembly according to claim 13 wherein the at least one levitation control unit further comprises at least one sensor.

15. The bearingless hub assembly according to claim 12 wherein the first repel force, the second repel force, and the third repel force operate to produce a spin-plane levitation of the rim assembly with respect to the common axis and a stabilization levitation of the rim assembly with respect to the at least one levitation control unit.

16. The bearingless hub assembly according to claim 12 wherein at least one of the front drive plate and the rear drive plate is configured to mechanically carry at least one motion control component selected from the group consisting of an electromagnetic actuator, a levitation control unit, and a speed sensor.

17. The bearingless hub assembly according to claim 16 further comprising:

the electromagnetic actuator positioned at one of the outer end and the inner end of the rim, defined as a powered end, and proximate a circumference of the powered end of the rim; and an electromagnetic field of the electromagnetic actuator and a respective polarity of a subset of the plurality of embedded magnets at the powered end configured to create a rotational force operable to freely spin the rim about an axis of the rim in a spin direction defined by the electromagnetic field.

18. The bearingless hub assembly according to claim 12 wherein the component mounting plate further comprises a plurality of mounting points configured to mechanically carry at least one of a secondary electronic brake system, at least one electronic steering piston, and an upper control arm and a lower control arm.

19. The bearingless hub assembly according to claim 18 wherein the upper and lower control arms are further configured to mechanically mount to a vehicle chassis.

20. A method of operating a bearingless hub assembly comprising:
- a rim comprising:
  - a tube magnet,
  - a cylindrical body characterized by an outer end and an inner end,
  - a rim center hole axially centered through the cylindrical body and configured to fittedly receive the tube magnet,
  - a plurality of embedded magnets, and
  - a plurality of magnet slots disposed about the outer end and the inner end of the cylindrical body at a magnet slot depth and configured to fittedly receive a respective one of the plurality of embedded magnets;
- a front rim cap comprising:
  - a front rim cap center hole axially centered through the front rim cap, and
  - a front rim cap ring magnet;
- a rear rim cap comprising:
  - a rear rim cap center hole axially centered through the rear rim cap, and
  - at least one rear rim cap loop magnet;
- a front drive plate comprising:
  - a first front drive center hole axially centered in the front drive plate,
  - a second front drive center hole axially centered in the front drive plate and opposite the first front drive center hole, and
  - a front drive plate ring magnet;
- a rear drive plate comprising:
  - a rear drive center hole axially centered through the rear drive plate, and
  - at least one rear drive plate loop magnet; and
- a spindle assembly comprising:
  - a threaded insert characterized by a fastening portion comprising an externally-threaded cylinder having first and second ends, and
  - a sleeve magnet having an internally-threaded sleeve bore configured to receive the fastening portion of the threaded insert from the second end of the externally-threaded cylinder;

wherein the front rim cap is fixedly mounted to the outer end of the cylindrical body of the rim and configured to secure, in relation to the rim, an outer subset of the plurality of embedded magnets disposed about the outer end of the cylindrical body;

wherein the rear rim cap is fixedly mounted to the inner end of the cylindrical body of the rim and configured to secure, in relation to the rim, an inner subset of the plurality of embedded magnets disposed about the inner end of the cylindrical body;

wherein the spindle assembly is positioned to extend, starting from the second end of the fastening portion of the threaded insert, through the rear drive center hole of the rear drive plate, the rear rim cap center hole of the rear rim cap, the rim center hole of the rim, the front rim cap center hole of the front rim cap, and the first and second front drive center holes of the front drive plate, in turn, such that
  - a respective first substantially similar polarity of the tube magnet and the sleeve magnet create a first repel force that operates to freely mount the rim center hole of the rim proximate to the threaded insert of the spindle assembly at a first levitation spacing of the first repel force,
  - a respective second substantially similar polarity of the front rim cap ring magnet and the front drive plate ring magnet create a second repel force that operates to freely mount the front rim cap proximate to the front drive plate at a second levitation spacing of the second repel force, and
  - a respective third substantially similar polarity of the at least one rear rim cap loop magnet and the at least one rear drive plate loop magnet create a third repel force that operates to freely mount the rear rim cap proximate to the rear drive plate at a third levitation spacing of the third repel force;

the method comprising:
- mechanically mounting to at least one of the front drive plate and the rear drive plate an electromagnetic actuator;
- positioning the electromagnetic actuator at one of the outer end and the inner end of the rim, defined as a powered end, and proximate a circumference of the powered end of the rim; and
- creating, using an electromagnetic field of the electromagnetic actuator and a respective polarity of a subset of the plurality of embedded magnets at the powered end, a rotational force that operates to freely spin the rim about an axis of the rim in a spin direction defined by the electromagnetic field.

* * * * *